(12) United States Patent
Parker

(10) Patent No.: US 8,464,398 B2
(45) Date of Patent: Jun. 18, 2013

(54) AUTOMOBILE AND TRUCK ACCESSORY

(76) Inventor: Brian E. Parker, Tabernacle, NJ (US)

(*) Notice: Subject to any disclaimer, the term of this patent is extended or adjusted under 35 U.S.C. 154(b) by 514 days.

(21) Appl. No.: 12/799,877

(22) Filed: May 4, 2010

(65) Prior Publication Data

US 2011/0272958 A1 Nov. 10, 2011

(51) Int. Cl.
*B25G 1/10* (2006.01)
(52) U.S. Cl.
USPC .......................................... 16/422; 296/1.07
(58) Field of Classification Search
USPC ........... 16/421, 422, 426, 428, 430; 296/1.07, 296/1.11, 1.02
See application file for complete search history.

(56) References Cited

U.S. PATENT DOCUMENTS

| | | | | |
|---|---|---|---|---|
| 5,052,320 A * | 10/1991 | Cremer | .......................... | 114/146 |
| 6,360,402 B1 * | 3/2002 | Crabtree | .......................... | 16/430 |
| 6,722,689 B2 * | 4/2004 | Kreamer | ........................ | 280/642 |
| 6,920,667 B2 * | 7/2005 | Joesten | ........................ | 16/114.1 |
| 6,961,978 B2 * | 11/2005 | Earley et al. | ..................... | 16/406 |
| 2007/0019312 A1 * | 1/2007 | Hu | ................................ | 359/871 |

* cited by examiner

*Primary Examiner* — Jeffrey O Brien
(74) *Attorney, Agent, or Firm* — Stuart M. Goldstein

(57) ABSTRACT

An accessory for an external side view mirror unit which has a frame for rigidly securing the accessory to the side view mirror unit. An upstanding handlebar extends from the frame to allow the driver of an automobile, truck, or similar motor vehicle to extend his or her arm from the motor vehicle and grasp the handlebar, thus acknowledging to passing motorcyclists that the driver of the motor vehicle is a fellow cyclist.

4 Claims, 4 Drawing Sheets

AUTOMOBILE AND TRUCK ACCESSORY

FIELD OF THE INVENTION

This invention relates to an optional accessory for attachment to an automobile, truck, van, or similar motor vehicle, specifically for attachment to the external side view mirror of the vehicle.

BACKGROUND OF THE INVENTION

Serious motorcyclists would rather be riding their motorcycles than driving an automobile. In fact, there is a special kinship between motorcyclists which is expressed in many ways, e.g. participation in motorcycle clubs or organizations, attendance at motorcycle conventions, memberships in motorcycle associations, etc.

A physical expression of comradery is clearly exhibited when two motorcyclists wave or nod to acknowledge each other as their bikes pass on the open road. However, a motorcyclist driving a car or truck who passes a cyclist on a motorcycle has no means to acknowledge that he or she is a fellow motorcyclist.

SUMMARY OF THE INVENTION

It is thus the object of the present invention to provide an accessory which can quickly, safely, and securely attach to an automobile, truck, van, or similar motor vehicle with an external side view mirror, which provides notice to individuals riding passing motorcycles, that the driver of the automobile or other motor vehicle is a fellow cyclist.

This object is accomplished by the present invention, an accessory for an external side view mirror unit which has a frame for rigidly securing the accessory to the side view mirror unit. An upstanding handlebar extends from the frame to allow the driver of an automobile, truck, or similar motor vehicle to extend his or her arm from the motor vehicle and grasp the handlebar, thus acknowledging to passing motorcyclists that the driver of the motor vehicle is a fellow cyclist.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
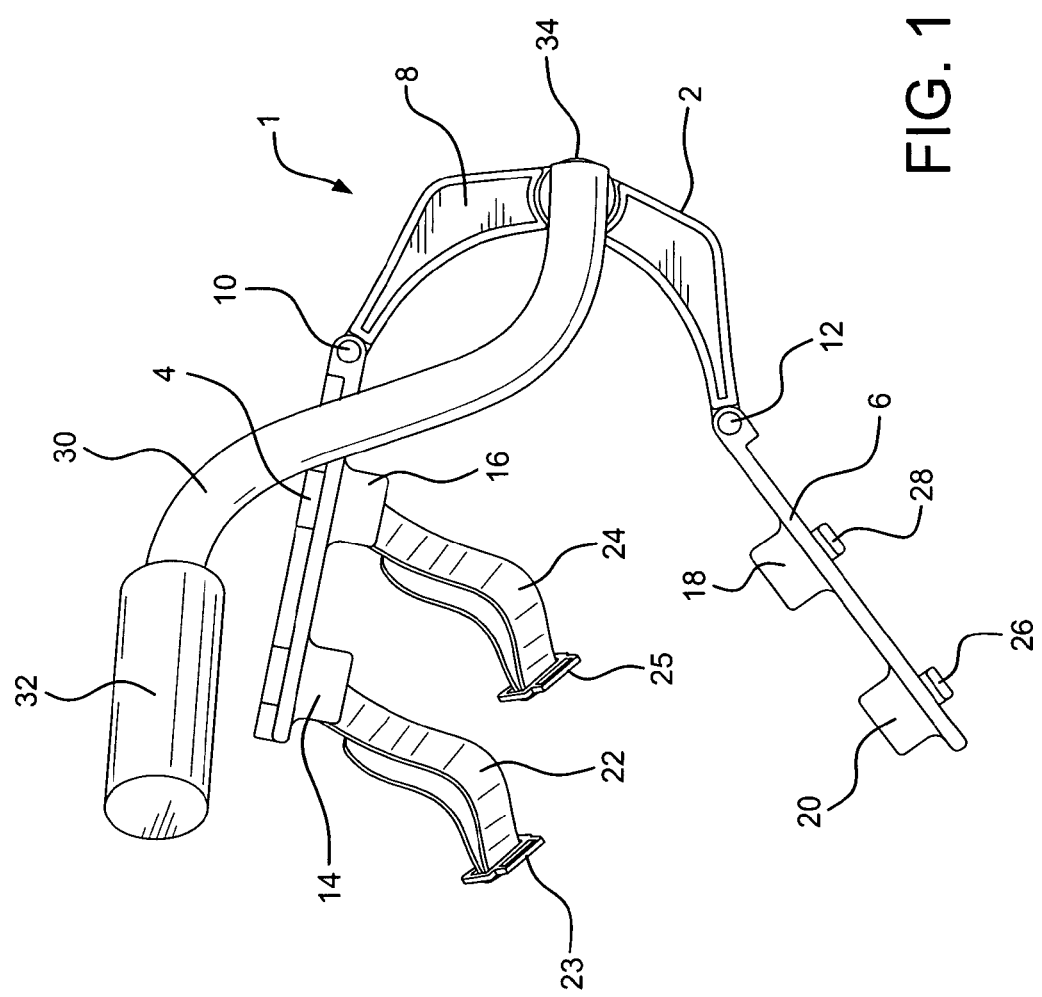
FIG. 1 is an elevation view of the accessory of the present invention.

Automobile or truck accessory 1 of the present invention comprises frame 2 having upper support arm 4, lower support arm 6 and interconnecting intermediate section 8. Upper support arm 4 is attached to intermediate section 8 at their juncture by pivotable connection 10 and lower support arm 6 is attached to intermediate section 8 at its juncture by pivotable connection 12. L-shaped clip members 14 and 16 project from upper support arm 4 and L-shaped clip members 18 and 20 project from lower support arm 6.

Straps 22 and 24, with tab receiving members 23 and 25, are attached to upper support arm 4 and extend down to lower support arm 6. Straps 22 and 24 are rubber or rubber equivalent, and so are flexibly biased such that their lengths are adjustable. Attachment tabs 26 and 28 project from lower support arm 6.

Handlebar 30, with hand grip 32, is secured to and supported by frame 2 at the approximate mid-point 34 of intermediate section 8.

Figure 2:
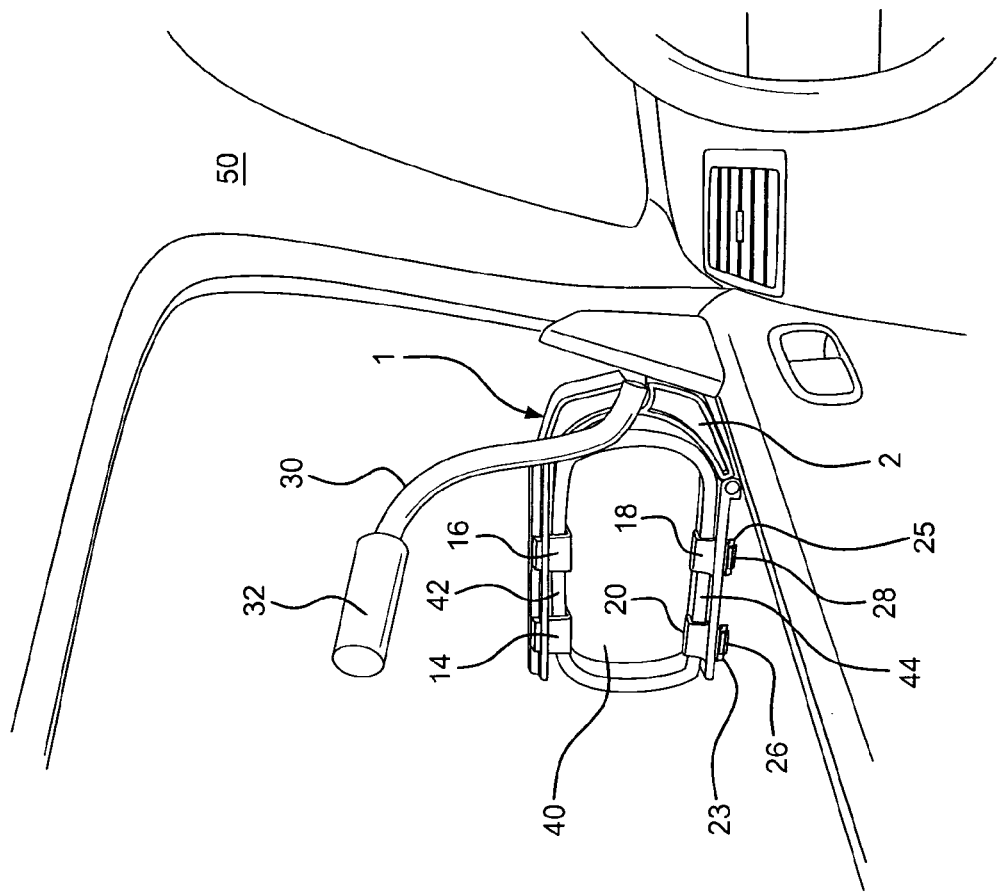
FIG. 2 is a view looking forward of an automobile showing the accessory of the present invention mounted on a side view mirror unit of an automobile.

As best seen in FIG. 2, accessory 1 is mounted on external side view mirror unit 40 of automobile 50 by positioning frame 2 around the top, bottom and internal sides of the mirror unit. Pivotable connections 10 and 12 allow support arms 4 and 6 to conform to the shape of virtually any side view mirror unit. Clip members 14, 16, 18, and 20 are positioned over the overhanging upper and lower lips 42 and 44 which frame mirror unit 40.

Figure 3:
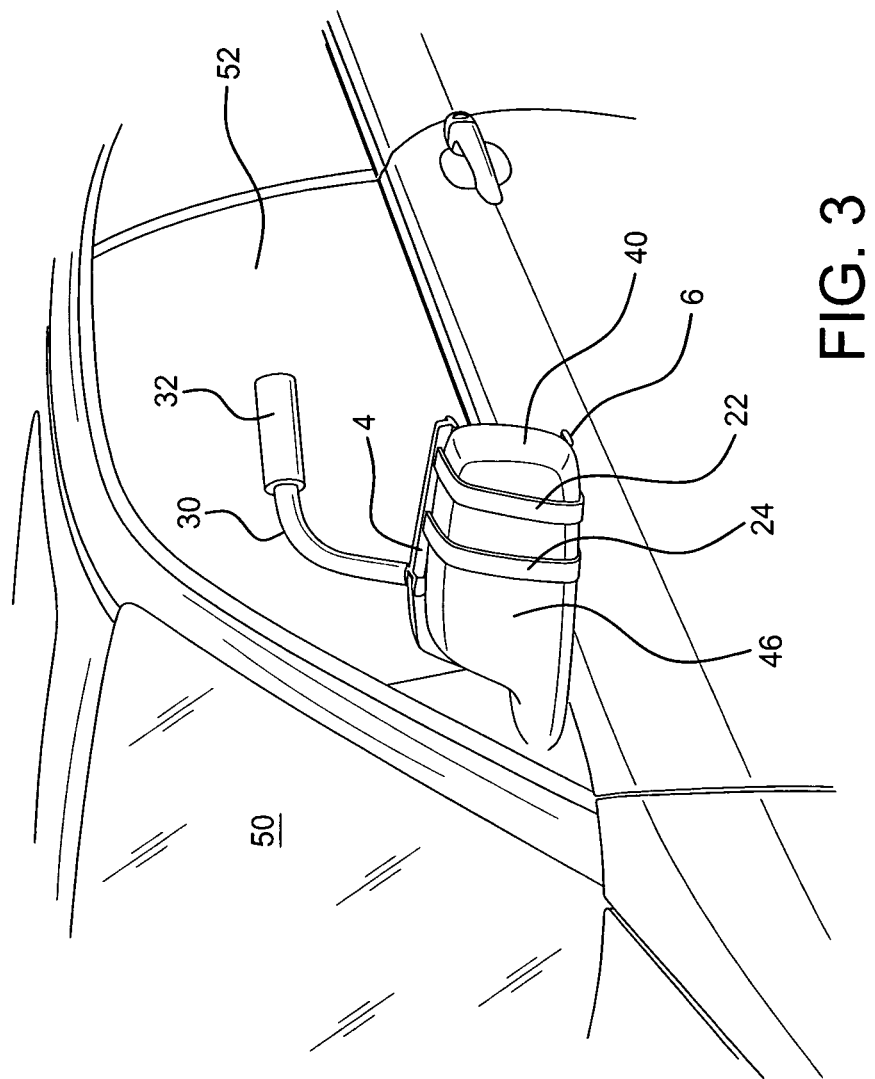
FIG. 3 is a view looking rearward of the automobile showing the accessory of the present invention mounted on the side view unit of the automobile.

As best seen in FIGS. 2 and 3, straps 22 and 24 are then stretched to extend around front surface 46 of mirror unit 40 and their respective tab receiving members 23 and 25 are inserted into and connected to tabs 26 and 28 to hold frame 2 in place on the mirror unit. In this position, handlebar 30 is secured and supported by frame 2 in an upstanding position, adjacent to and forward of driver's side window 52.

Figure 4:
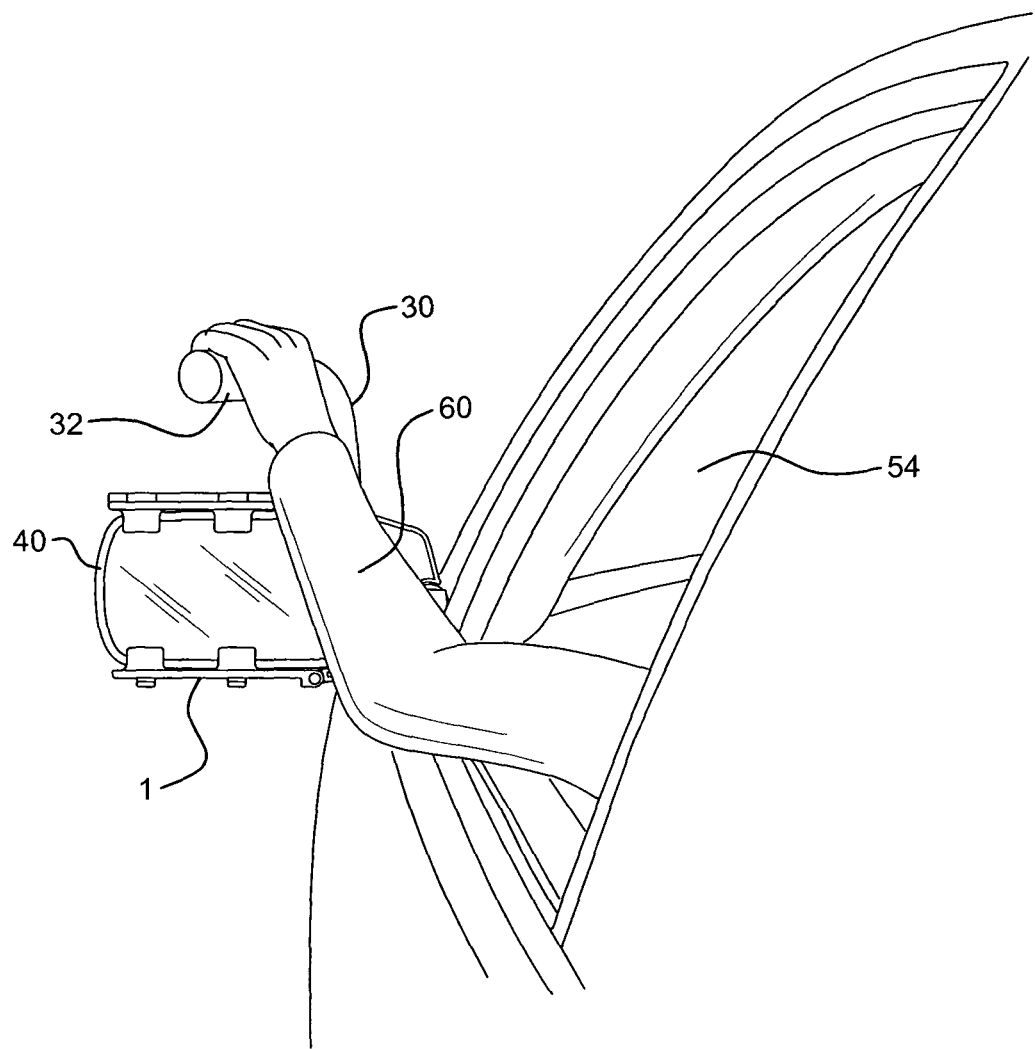
FIG. 4 shows the manner of usage of the accessory of the present invention.

As best seen in FIG. 4, a driver need only open window 52, extend his or her arm 60 out window opening 54 and grasp hand grip 32 of handlebar 30, when a fellow motorcyclist passes by.

Accessory 1 can be used on any automobile, truck van, SUV, or other motor vehicle having an external side view mirror unit and it can be configured to be mounted on the mirror unit located either on the driver's side or the passenger's side of the vehicle. Since driver safety is of primary importance, accessory 1 is designed to be mounted on the front face of the mirror unit to ensure that the mirror positioned in the unit is not obstructed.

Certain novel features and components of this invention are disclosed in detail in order to make the invention clear in at least one form thereof. However, it is to be clearly understood that the invention as disclosed is not necessarily limited to the exact form and details as disclosed,

The invention claimed is:

1. A motorcycle rider notice system of a motor vehicle, comprising:
    an external side view mirror extending from the motor vehicle, said side view mirror having an inboard side adjacent to the vehicle and an opposite outboard side;
    a frame comprising a lower support arm extending under the side view mirror, an upper support arm extending over the side view mirror, and an interconnecting intermediate section extending around the inboard side of the side view mirror, said upper and lower support arms having clip members projecting therefrom, the clip members positioned around an outside periphery of the side view mirror;
    straps attached to the upper support arm, said straps extend around a forward face of the side view mirror and attach to tabs projecting from the lower support arm; and
    a handlebar secured to the intermediate section of and supported by the frame in an upstanding position, said handlebar extending above and over the side view mirror and the frame.

2. The motorcycle rider notice system as in claim 1 wherein the frame comprises means to adjust the frame to various side view mirror configurations.

3. The motorcycle rider notice system as in claim 2 wherein the means to adjust the frame comprises pivoted connections located at an upper junction between the upper support arm and the intermediate section and a lower junction between the lower support arm and the intermediate section.

4. The motorcycle rider notice system as in claim 1 wherein the straps are biasedly rubberized.

* * * * *